(12) United States Patent
Honsinger et al.

(10) Patent No.: US 12,304,766 B2
(45) Date of Patent: May 20, 2025

(54) REUSABLE REEL HOLDER AND BAG WITH REUSABLE REEL HOLDER

(71) Applicant: PPC BROADBAND, INC., East Syracuse, NY (US)

(72) Inventors: Brian Honsinger, Warners, NY (US); Noah P. Montena, Syracuse, NY (US); Peter A. Carapella, Fayetteville, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 452 days.

(21) Appl. No.: 17/666,545

(22) Filed: Feb. 7, 2022

(65) Prior Publication Data
US 2022/0250871 A1    Aug. 11, 2022

Related U.S. Application Data

(60) Provisional application No. 63/146,554, filed on Feb. 5, 2021.

(51) Int. Cl.
*B65H 49/20* (2006.01)
*B65H 49/36* (2006.01)

(52) U.S. Cl.
CPC .......... *B65H 49/205* (2013.01); *B65H 49/36* (2013.01); *B65H 2701/32* (2013.01)

(58) Field of Classification Search
CPC ....... B65H 49/36; B65H 49/322; B65H 75/02
See application file for complete search history.

(56) References Cited

U.S. PATENT DOCUMENTS 3,680,810 A * 8/1972 Jarmalow ............ B65D 85/676
206/408
5,529,186 A    6/1996 Bass
(Continued)

OTHER PUBLICATIONS

Search Report dated May 24, 2022 in corresponding International Application No. PCT/US2022/015542, 6 pages.
(Continued)

*Primary Examiner* — William A. Rivera
(74) *Attorney, Agent, or Firm* — MH2 TECHNOLOGY LAW GROUP LLP

(57) ABSTRACT

A reel holder includes a first reel holder member including a first frame member and a first ring member a second reel holder member including a second frame member and a second ring member. The first ring member is configured to be coupled with the first frame member such that the first ring member is configured to be rotatable relative to the first frame member, and the second ring member is configured to be coupled with the second frame member such that the second ring member is configured to be rotatable relative to the second frame member. The first ring member is configured to be coupled with a first flange of a reel, and the second ring member is configured to be coupled with a second flange of reel. The first ring member is configured to rotate relative to the first frame member when the reel is rotated, the second ring member is configured to rotate relative to the second frame when the reel is rotated. The first ring member includes protrusions configured to extend through the first flange of the reel, a radially outer surface of each of the protrusions is configured to support an inner surface of a hub of the reel, the second ring member includes protrusions configured to extend through the second flange of the reel, and a radially outer surface of each of the protrusions is configured to support the inner surface of the hub.

28 Claims, 9 Drawing Sheets

(56) References Cited

U.S. PATENT DOCUMENTS

| | | | |
|---|---|---|---|
| 6,234,421 B1* | 5/2001 | Cox | B65H 75/14 |
| | | | 242/588 |
| 7,204,452 B2 | 4/2007 | Wilkinson et al. | |
| 8,366,126 B2 | 2/2013 | Galgano et al. | |
| 2010/0243784 A1 | 9/2010 | Johanson et al. | |
| 2010/0314484 A1 | 12/2010 | Houston et al. | |
| 2017/0036884 A1* | 2/2017 | Cox | B65H 49/324 |
| 2021/0300718 A1* | 9/2021 | Thakare | B65H 75/30 |
| 2022/0081248 A1* | 3/2022 | Benichou | B65H 49/321 |
| 2023/0271805 A1* | 8/2023 | Tessier | B65H 49/322 |
| | | | 242/557 |

OTHER PUBLICATIONS

Written Opinion dated May 24, 2022 in corresponding International Application No. PCT/US2022/015542, 7 pages.

* cited by examiner

REUSABLE REEL HOLDER AND BAG WITH REUSABLE REEL HOLDER

CROSS-REFERENCE TO RELATED APPLICATION

This application claims the benefit of U.S. Provisional Application No. 63/146,554, filed on Feb. 5, 2021. The disclosure of the prior application is hereby incorporated by reference herein in its entirety.

TECHNICAL FIELD

The present disclosure relates to a reusable reel holder and, more particularly, to a reusable reel holder configured to receive a reel for storing and dispensing fiber optic cable, or other types of cable, wire, and the like.

BACKGROUND

Conventionally, various types of cable, wire, and the like are wound onto reels for storage, shipping, and field use. Typical reels are constructed of wood or plastic that is capable of withstanding the stresses of storage and shipping. The weight of the reels adds to the cost of transportation of the cable, wire, or the like that is held on the reel, which increases the cost that must be paid for by the customer or vendor. After the reels are emptied, typically, the reels are then thrown away because the cost of returning them to the supplier for reuse is too high.

Therefore, it may be desirable to provide a reusable reel holder that can hold a disposable reel of cable constructed of cardboard. For example, it may be desirable to provide a reel holder that can be assembled and disassembled by a technician such that a reel of cable, wire, or the like can be mounted on the reel holder in the field. Further, it may be desirable to provide a reusable reel holder that can provide radial support to the drum of a reel of cable. Moreover, it may be desirable to provide a reusable reel holder that can prevent deformation of flanges of a reel of cable. Additionally, it may be desirable to provide a bag with a reusable reel holder and a reel of cable on the reel holder.

SUMMARY

According to various aspects of the disclosure, a reel holder includes a first reel holder member including a first frame member and a first ring member a second reel holder member including a second frame member and a second ring member. The first ring member is configured to be coupled with the first frame member such that the first ring member is configured to be rotatable relative to the first frame member, and the second ring member is configured to be coupled with the second frame member such that the second ring member is configured to be rotatable relative to the second frame member. The first ring member is configured to be coupled with a first flange of a reel, and the second ring member is configured to be coupled with a second flange of reel. The first ring member is configured to rotate relative to the first frame member when the reel is rotated, the second ring member is configured to rotate relative to the second frame when the reel is rotated. The first ring member includes protrusions configured to extend through the first flange of the reel, a radially outer surface of each of the protrusions is configured to support an inner surface of a hub of the reel, the second ring member includes protrusions configured to extend through the second flange of the reel, and a radially outer surface of each of the protrusions is configured to support the inner surface of the hub.

In some embodiments, a cable reel assembly includes the aforementioned reel holder and a container configured to receive the reel holder and a reel of cable.

According to some aspects, the cable reel assembly further includes a reel of fiber optic cable, and the container is a bag.

In various aspects of the cable reel assembly, the reel of cable, the first ring member, and the second ring member are configured to rotate relative to the bag.

In some aspects of the cable reel assembly, the reel of cable, the first ring member, and the second ring member are configured to rotate relative to the container.

The foregoing and other features of construction and operation of the invention will be more readily understood and fully appreciated from the following detailed disclosure, taken in conjunction with accompanying drawings.

DETAILED DESCRIPTION OF EMBODIMENTS

Figure 1:
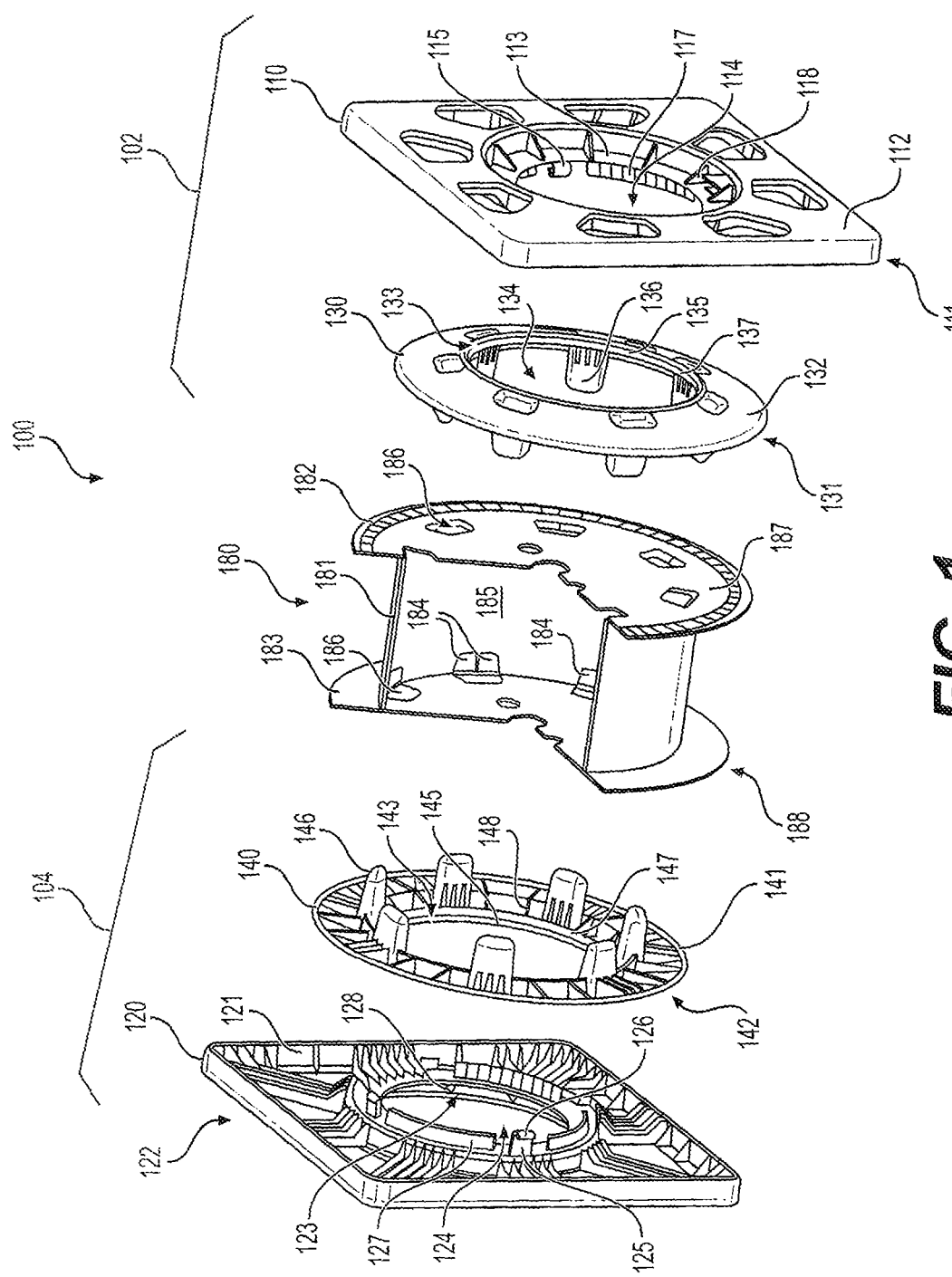
FIG. 1 is an exploded perspective view of an exemplary reel holder in accordance with various aspects of the disclosure.

As a preface to the detailed description, it should be noted that, as used in this specification and the appended claims, the singular forms "a," "an," and "the" include plural referents, unless the context clearly dictates otherwise.

Referring to FIG. 1-6, an exemplary reusable reel holder 100 in accordance with various aspects of the disclosure is illustrated and described. The reel holder 100 includes a first frame member 110, a second frame member 120, a first ring member 130, and a second ring member 140. The first frame member 110 and the first ring member 130 are configured to be coupled with one another, and the second frame member 120 and the second ring member 140 are configured to be coupled with one another, as described in more detail below.

Referring to FIG. 1, the first frame member 110 includes a first side 111 and an oppositely facing second side 112. The first frame member 110 also has a hub portion 113 defining an opening 114. A plurality of retention members 115, for example, flexible fingers, extend from the first side 111 in a direction away from the second side 112 and substantially perpendicular to the first frame member 110 and are spaced circumferentially about the hub portion 113. Ends of the retention members 115 include a radially inward lip 116

Figure 6:
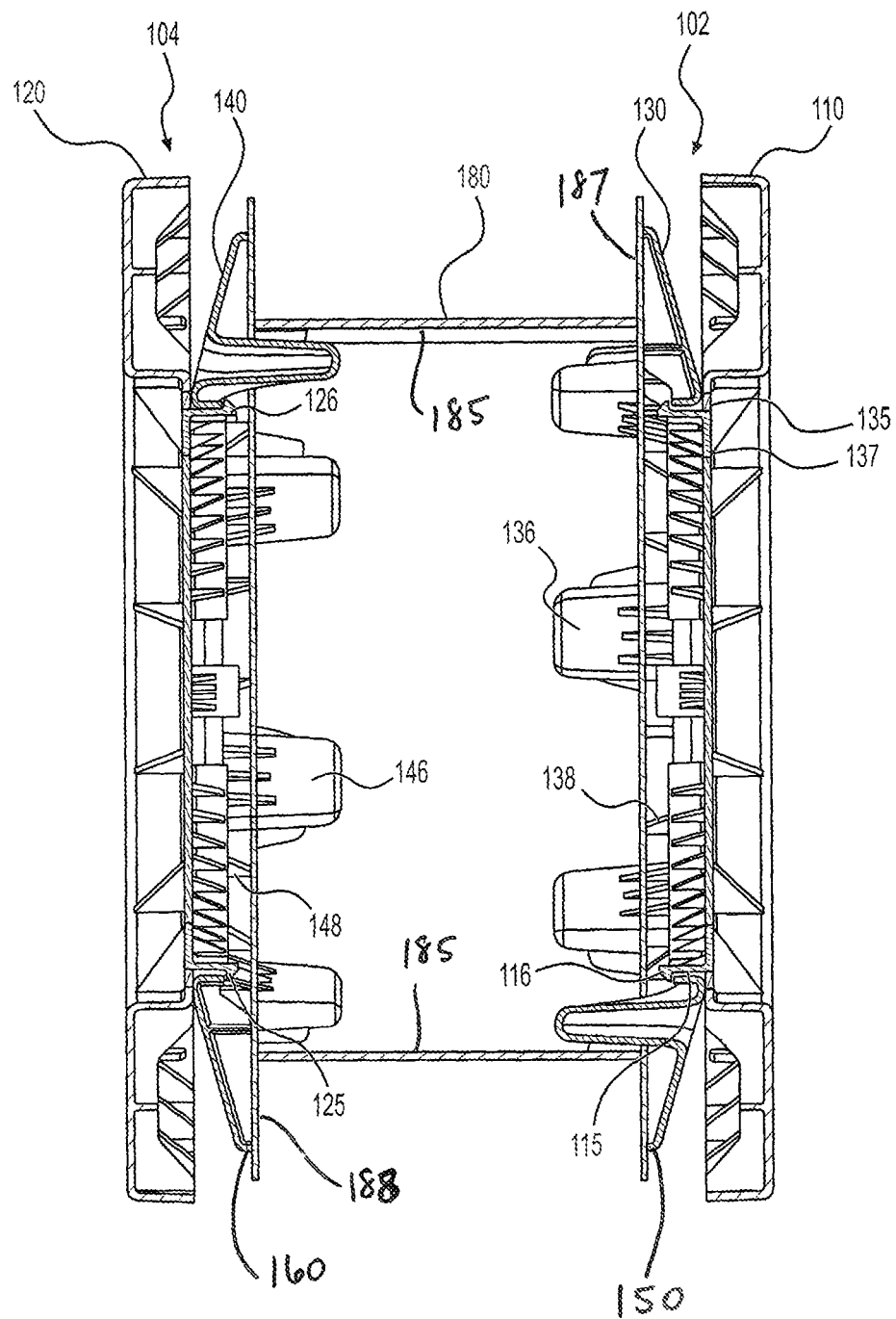
FIG. 6 is an end cross-sectional view of the assembled reel holder and reel of FIG. 5.
Figure 7:
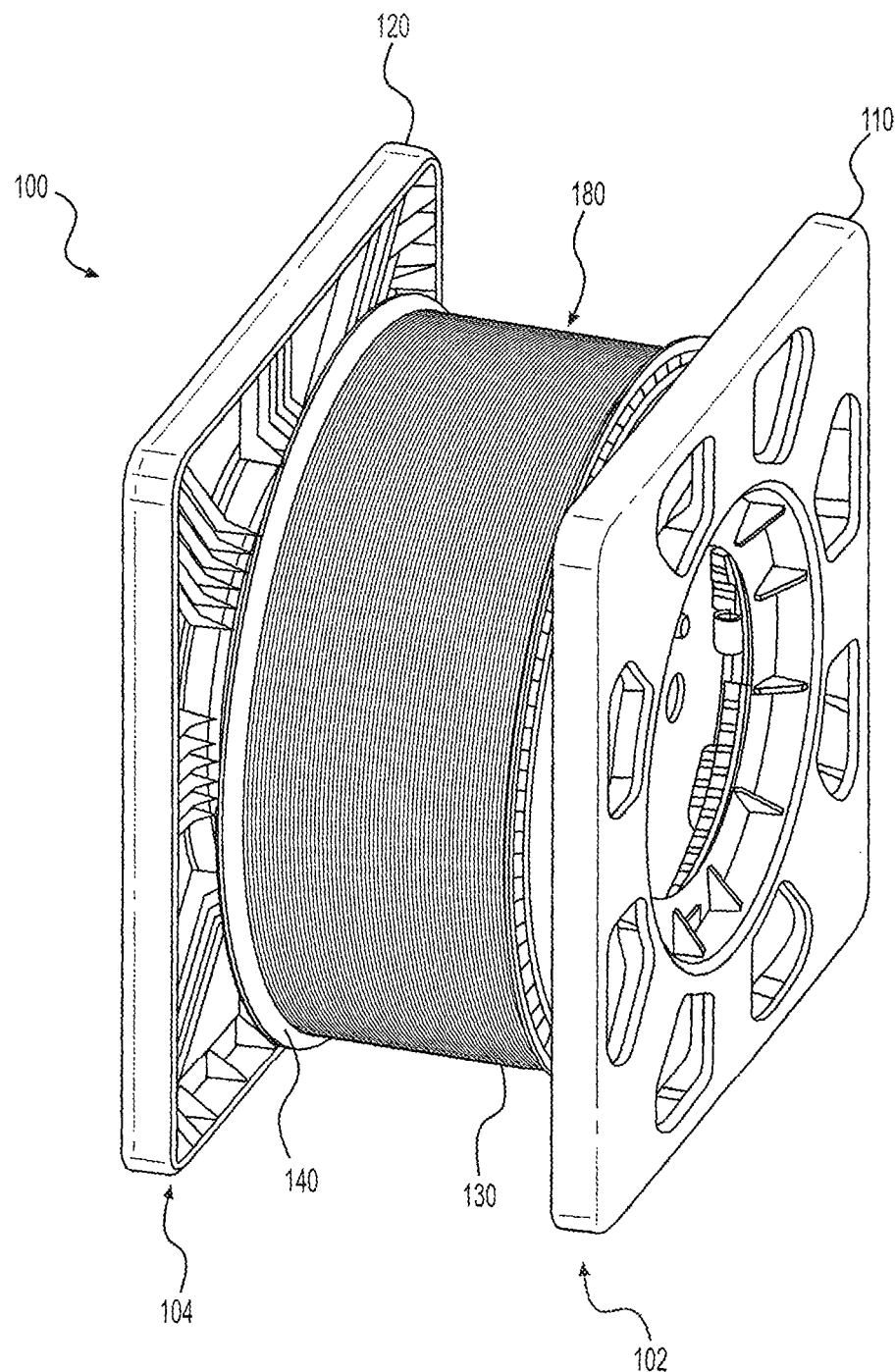
FIG. 7 is a perspective view of the reel holder of FIG. 1 assembled on a reel containing cable.

(FIG. 6). A plurality of bearing surfaces 117 also extend from the first side 111 such that the bearing surfaces 117 and the retention members 115 cooperated to define a circular bearing surface. The second side 112 includes a plurality of gussets 118 spaced circumferentially about the hub portion 113 to provide strength to the hub portion 113 without adding undesirable weight to the first frame member.

Figure 2:
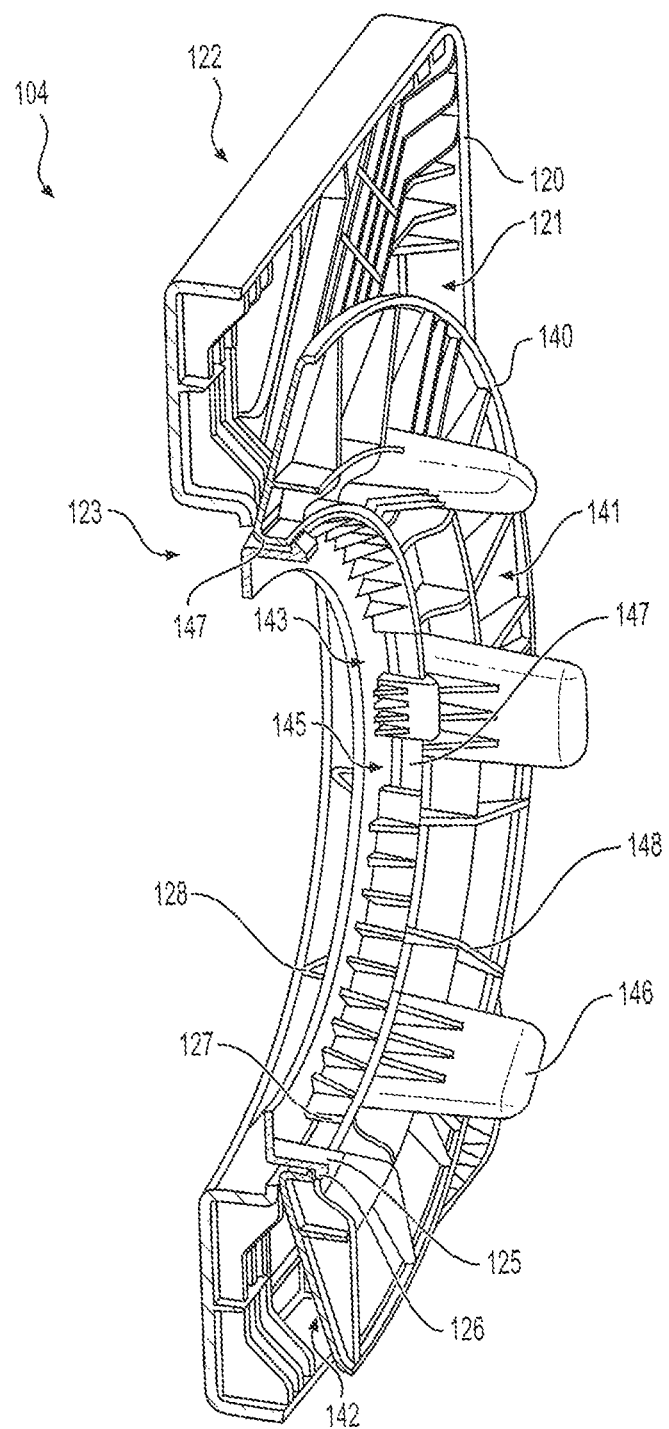
FIG. 2 is a perspective cross-sectional view of the second frame member and the second ring member of the reel holder of FIG. 1 is a coupled configuration.
Figure 3:
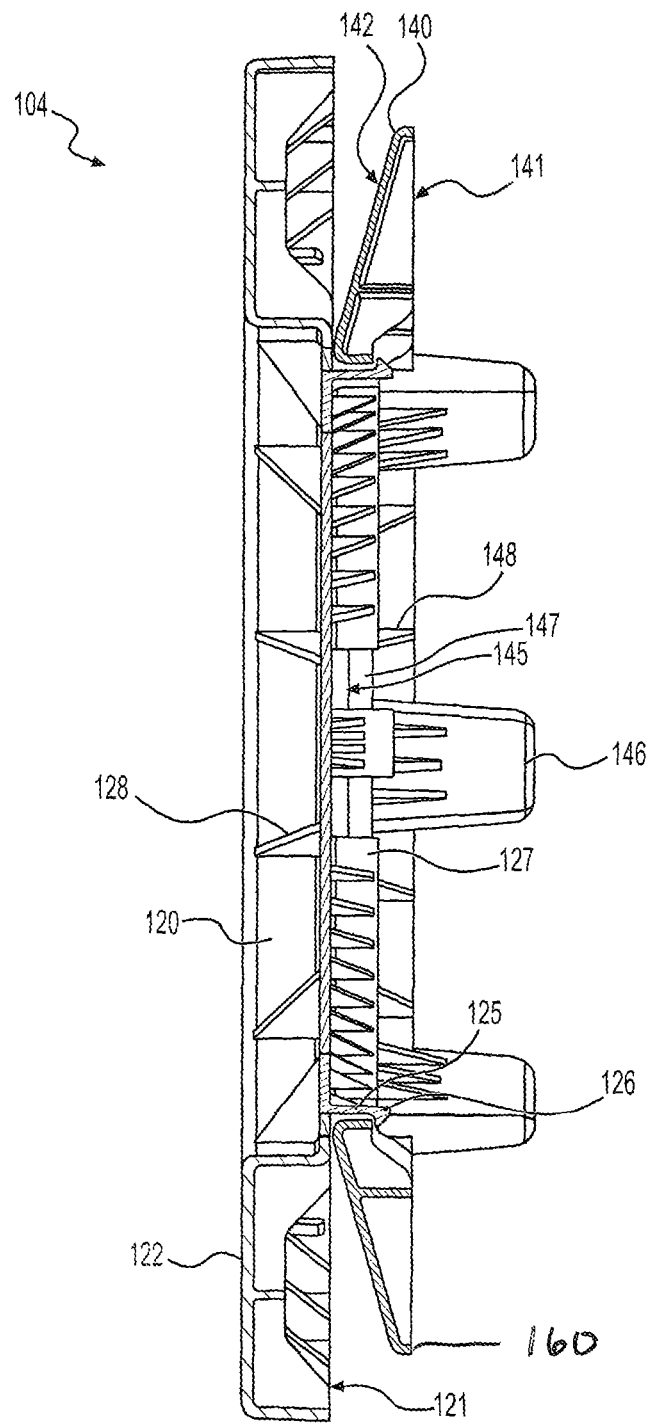
FIG. 3 is an end cross-sectional view of the coupled second frame member and second ring member of FIG. 2.

Referring now to FIGS. 1-3, the second frame member 120 similarly includes a first side 121 and an oppositely facing second side 122. The second frame member 120 also has a hub portion 123 defining an opening 124. A plurality of retention members 125, for example, flexible fingers, extend from the first side 121 in a direction away from the second side 122 and substantially perpendicular to the second frame member 120 and are spaced circumferentially about the hub portion 123. Ends of the retention members 125 include a radially inward lip 126 (FIG. 6). A plurality of bearing surfaces 127 also extend from the first side 121 such that the bearing surfaces 127 and the retention members 125 cooperated to define a circular bearing surface. The second side 122 includes a plurality of gussets 128 (FIG. 2) spaced circumferentially about the hub portion 123 to provide strength to the hub portion 123 without adding undesirable weight to the second frame member.

Referring again to FIG. 1, the first ring member 130 includes a first side 131 and an oppositely facing second side 132. The first ring member 130 also has a hub portion 133 defining an opening 134. The hub portion 133 includes an inner rim 135 that extends from the first side 131 of the first ring member 130. The hub portion 133 also includes a plurality of projections 136 that extend from the first side 131 in a direction away from the second side 132 and are spaced circumferentially about the hub portion 133. The projections 136 are structured and arranged to be received by and support a reel of cable, as will be discussed below. The inner rim 135 includes a radially-inward-facing bearing surface 137 configured to bear against the circular bearing surface defined by the radially-outward-facing bearing surface 117 and the retention members 115 of the first frame member 110. The second side 132 includes a plurality of gussets 138 (FIG. 6) spaced circumferentially about the hub portion 133 to provide strength to the hub portion 133 without adding undesirable weight to the first ring member.

Referring to FIGS. 1-3, the second ring member 140 similarly includes a first side 141 and an oppositely facing second side 142. The second ring member 140 also has a hub portion 143 defining an opening 144. The hub portion 143 includes an inner rim 145 that extends from the first side 141 of the second ring member 140. The hub portion 143 also includes a plurality of projections 146 that extend from the first side 141 in a direction away from the second side 142 and are spaced circumferentially about the hub portion 143. The projections 146 are structured and arranged to be received by and support a reel of cable, as will be discussed below. The inner rim 145 includes an radially-inward-facing bearing surface 147 configured to bear against the circular bearing surface defined by the radially-outward-facing bearing surface 127 and the retention members 125 of the second frame member 120. The second side 142 includes a plurality of gussets 148 spaced circumferentially about the hub portion 143 to provide strength to the hub portion 143 without adding undesirable weight to the second ring member.

Figure 4:
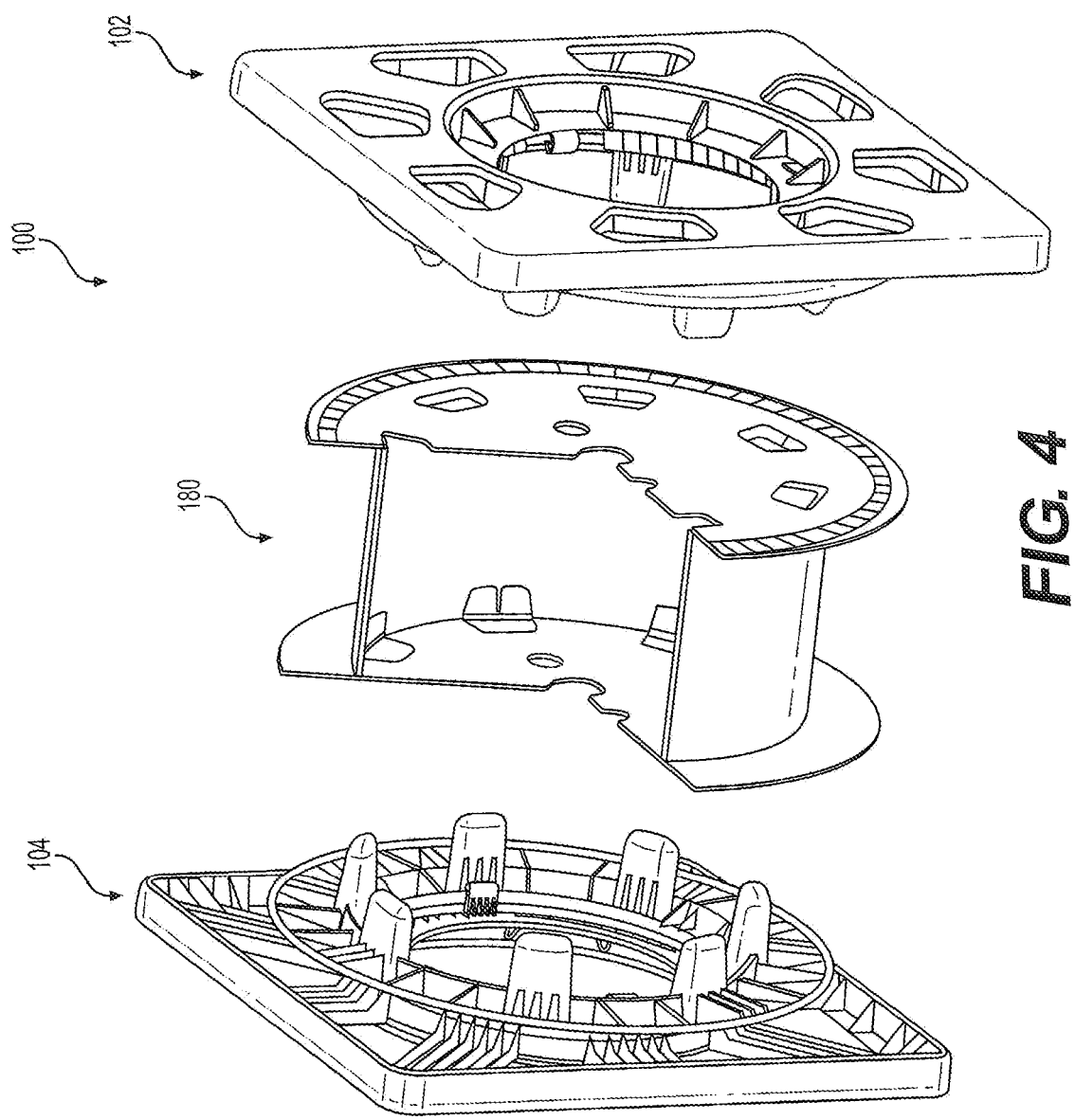
FIG. 4 is a perspective view of the reel holder of FIG. 1 unassembled relative to a reel.
Figure 5:
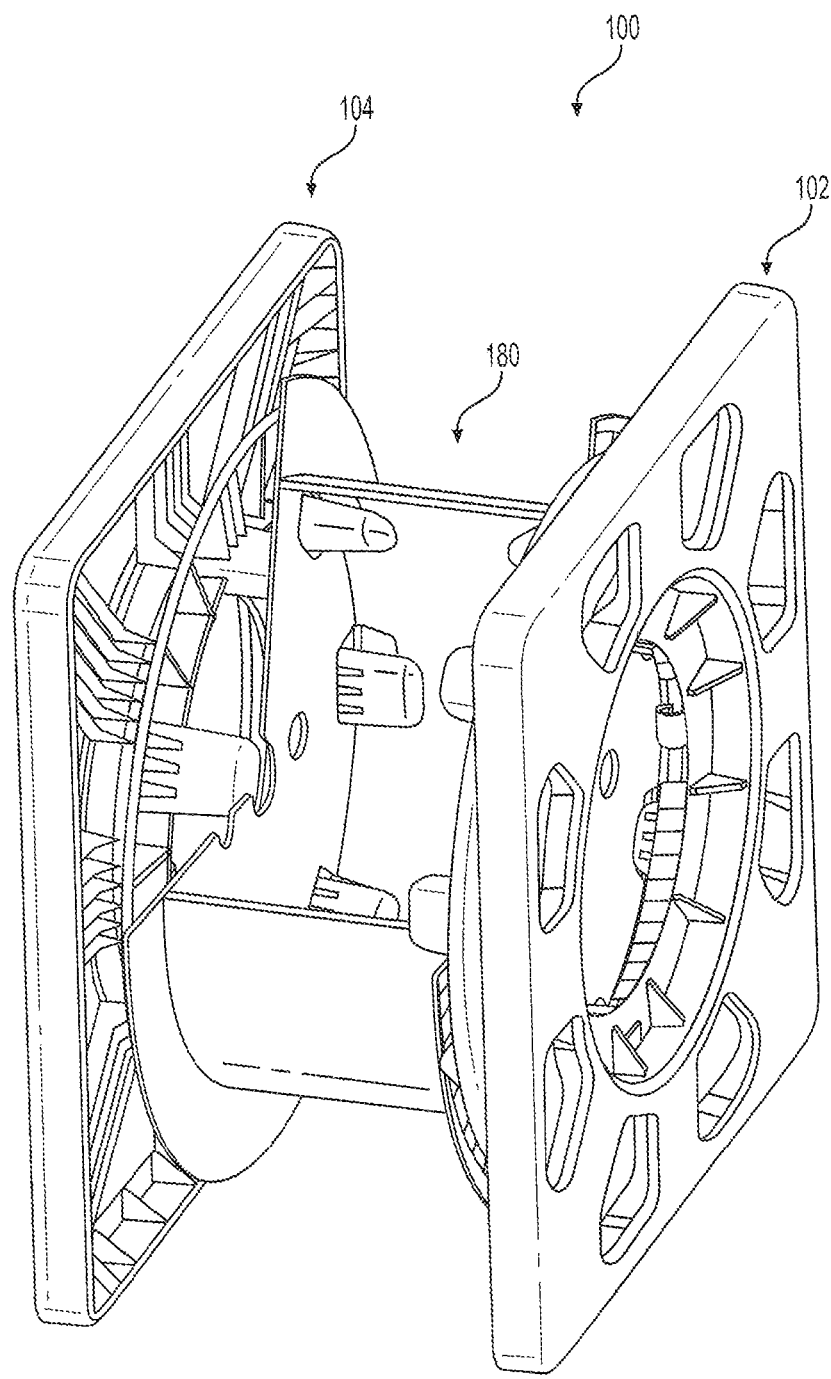
FIG. 5 is a perspective view of the reel holder of FIG. 1 assembled on a reel.

As best illustrated in FIGS. 2 and 3, the second frame member 120 and the second ring member 140 are configured to be coupled with one another such that the second frame member 120 and the second ring member 140 are rotatable relative to one another. For example, the hub portions 123, 143 are aligned with one another, and the first side 121 of the second frame member 120 and the second side 142 of the second ring member 140 are moved toward one another. The inner rim 145 of the hub portion 143 eventually engages the radial lips 126, urging the retention members 125 radially inward until the inner rim 145 moves past the radial lips 126, at which time the retention members 125 move radially outward toward their rest positions with the radial lips 126 extending radially outward past the inner rim 145 to couple the second frame member 120 and the second ring member 140 to one another. The first frame member 110 is similarly coupled with the first ring member 130, as shown in FIG. 4, for example.

The assembled first frame member 110 and first ring member 130 form a first reel holder member 102, and the assembled second frame member 120 and second ring member 140 form a second reel holder member 104. The first reel holder member 102 and the second reel holder member 104 are configured to hold a reel 180 of cable, for example, a reel of fiber optic cable. The reel 180 may include a drum 181 and a pair of flanges 182, 183 on opposite ends of the drum 181. In some embodiments, the flanges 182, 183 may be made from a flat, single-layer of corrugated cardboard, while the drum 181 may be made from a sturdier cardboard to prevent radial collapse when the cable is wrapped thereon.

The flanges 182, 183 may be attached to the drum 181 by gluing or any other known means. For example, a plurality of flaps 184 may be formed in each of the flanges 182, 183 by cutting or any other process. The flaps 184 are formed such that when the flaps 184 are folded in a first direction to a position substantially perpendicular to their respective flange, the flaps 184 come into contact with an inner surface 185 of the drum 181 and can be attached to the drum 181 by gluing or any other process. As illustrated, the plurality of flaps 184 are spaced circumferentially about the inner surface 185 of the drum 181 thus providing a plurality of connection points between the flanges 182, 183 and the drum 181. The areas of flanges 182, 183 where the flaps 184 are cut and folded so as to be structured and arranged to provide openings 186 configured to receive the projections 136 of the hub portion 133 or the projections 146 of the hub portion 143. For example, the openings 186 are circumferentially spaced apart to match the circumferential spacing of the projections 136, 146.

As best illustrated in FIG. 6, the projections 136 of the hub portion 133 of the first ring member 130 and the projections 146 of the hub portion 143 of the second ring member 140 are sized and arranged to be received by the openings 186 in the flanges 182, 183. Further, the projections 136, 146 are configured such that radial outward surfaces 139, 149 of the projections directly contact the flaps 184, which directly contact the drum 181 of the reel 180. Thus, the projections 136, 146 provide radial support to the inner surface 185 of the drum 181.

Also, the first ring member 130 may include a radially outer portion 150 that is configured to engage a radially outer portion 187 of flange 182, and the second ring member 140 may include a radially outer portion 160 that is configured to engage a radially outer portion 188 of the flange 183. The radially outer portions 187, 188 of the flanges 182, 183 are radially outward of the drum 181. The radially outer portions 150, 160 prevent deformation (e.g., outward bending, bowing, or buckling) of the radially outer portions 187, 188 of the flanges 182, 183 away from cable wound on the reel 180.

Figure 8:
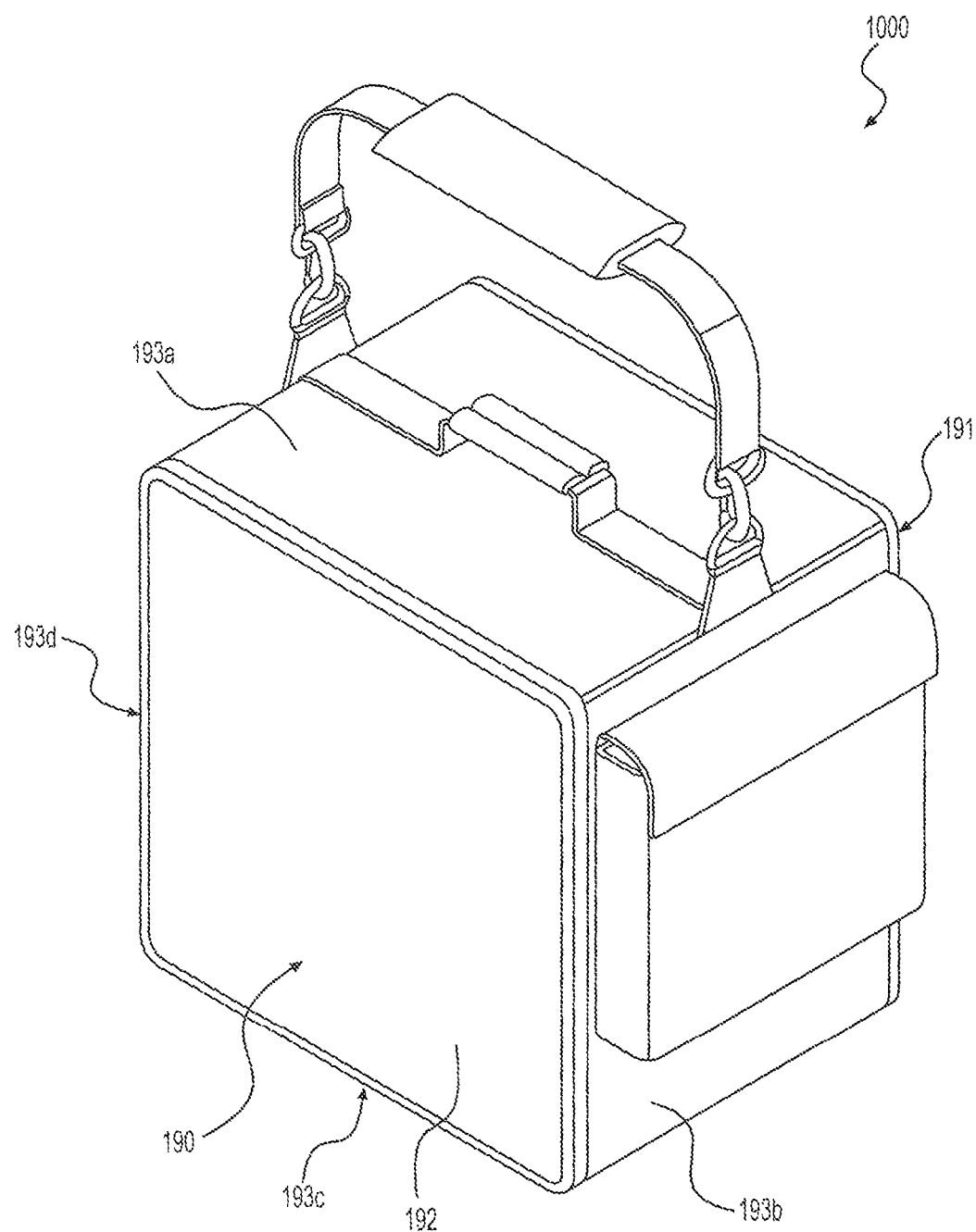
FIG. 8 is a perspective view of a container configured to receive the reel holder of FIG. 1.
Figure 9:
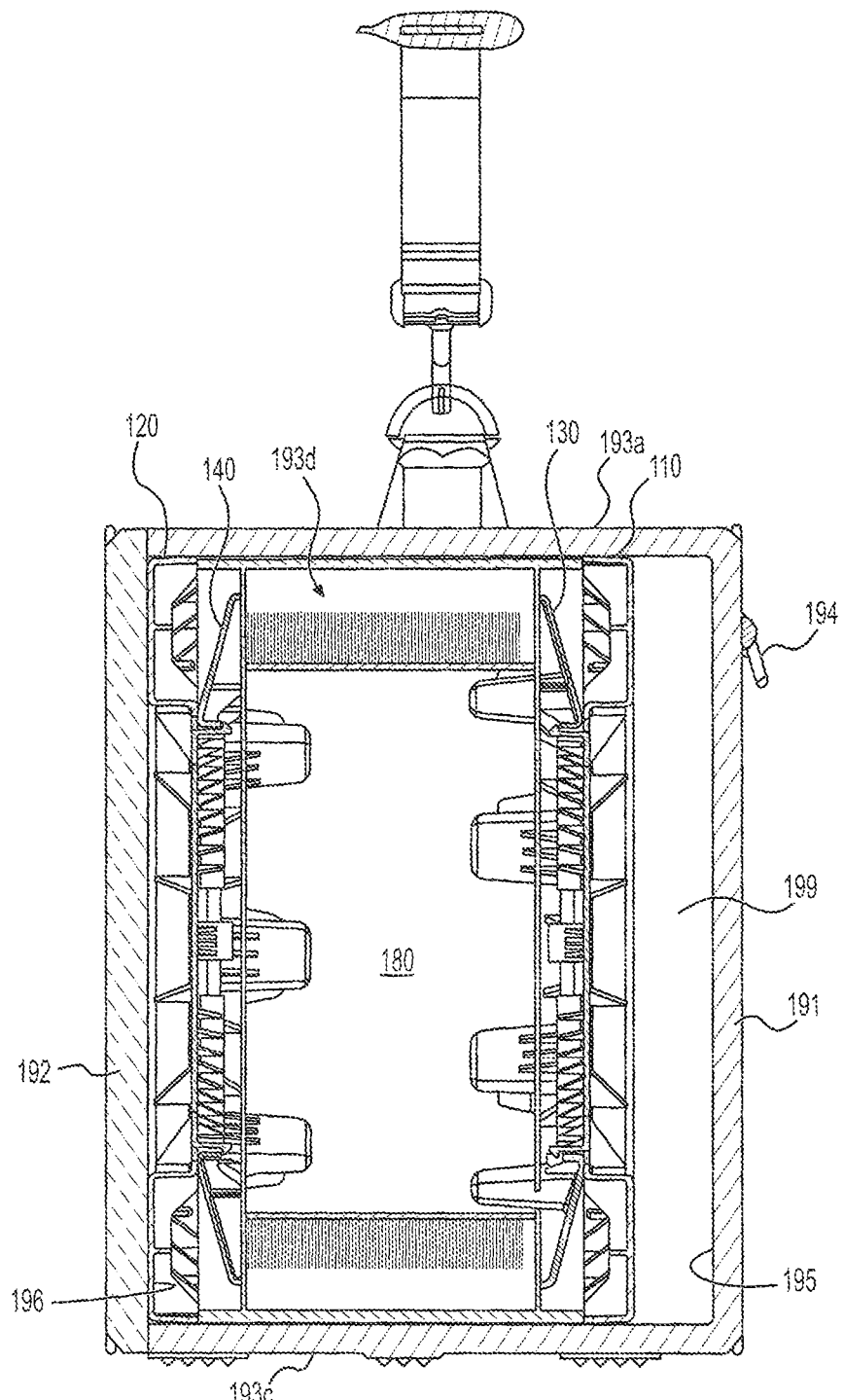
FIG. 9 is an end cross-sectional view of the container of FIG. 8 containing the assembled reel holder and reel of FIG. 7.

Referring now to FIGS. 8 and 9, a cable reel assembly 1000 may include the reel holder 100, the reel 180, and a container 190, for example, a bag. The container 190 includes a first wall 191 and an opposite second wall 192 that are sized to substantially match an outer periphery of the first frame member 110 and the second frame member 120. The first and second walls 191, 192 are spaced apart by four end walls 193a, 193b, 193c, 193d. The four end walls 193a, 193b, 193c, 193d form an inner periphery that substantially matches the outer periphery of the first frame member 110 and the second frame member 120. As a result, when the reel holder 100 is placed in the container 190 with the first frame member 110 adjacent the first wall 191 or the second wall 192 and with the second frame member 120 adjacent the other wall 191 or 192, alignment of the reel holder 100 relative to the container 190 is maintained and movement of the reel holder 100 relative to the container 190 is limited.

The four end walls 193a, 193b, 193c, 193d have a dimension between the first wall 191 and the second wall 192 sized to receive the reel holder 100 assembled on the reel 180. That is, the dimension between the first wall 191 and the second wall 192 sized can be sized such that projections 136, 146 of the reel holder portions 102, 104 extend into the openings 186 in the flanges 182, 183 of the reel 180. Because the first ring member 130 and the second ring member 140 are not connected to one another, the openings 186 in the flange 182 do not need to be aligned with the openings 186 in the flange 183. If the openings 186 in the flanges 182, 183 are not aligned with one another in the axial direction of the reel 180, the projects 136, 146 would not be aligned with one another in the axial direction of the reel 180. It should be appreciated that the dimension of the four end walls 193a, 193b, 193c, 193d between the first wall 191 and the second wall 192 should be sized similar to a dimension of the reel holder 100 assembled on the reel 180 that extends from the second side 112 of the first frame member 110 to the second side 122 of the second frame member 120 so that the projections 136, 146 cannot move out from the openings 186 in the flanges 182, 183. Thus, the container 190 can receive a reel 180 having a drum 181 with an axial dimension up to a maximum length determined by the dimension of the four end walls 193a, 193b, 193c, 193d.

The container 190 includes a zipper 194 that extends along three sides of a first wall 191 of the container 190 to permit a technician to access the reel holder 100 and the reel 190, as would be understood by persons skilled in the art. The container 190 may include straps or other holding members (not shown), for example, Velcro® straps, affixed to inner surfaces 195, 196 of the first wall 191 and the second wall 192, respectively. The straps can be placed through openings 119, 129 in the first frame member 110 and the second frame member 120 to securely hold the reel holder 100 in the container 190.

In some embodiments, the assembly 1000 may include an insert 199 configured to be placed in the container 190. For example, if the reel 180 includes a drum 181 having an axial dimension that is significantly less than the maximum length determined by the dimension of the four end walls 193a, 193b, 193c, 193d, the projections 136, 146 of the first ring member 130 or the second ring member 140 may be able to move out from the openings 186 in the one or both of the flanges 182, 183. In such a situation, the insert 199 may be placed in the container 190 between the second wall 112, 122 of one or both of the first and second frame members 110, 120 to prevent the projections 136, 146 from moving out from the openings 186 in the flanges 182, 183. The insert 199 thus permits the container 190 to be usable with reels 180 having hubs 181 of varying axial lengths.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A reusable reel holder comprising:
a first reel holder member including a first frame member and a first ring member; and
a second reel holder member including a second frame member and a second ring member;
wherein the first ring member is configured to be coupled with the first frame member such that the first ring member is configured to be rotatable relative to the first frame member;
wherein the second ring member is configured to be coupled with the second frame member such that the second ring member is configured to be rotatable relative to the second frame member;
wherein the first ring member is configured to be coupled with a first flange of a reel of cable;
wherein the second ring member is configured to be coupled with a second flange of the reel of cable;
wherein the first ring member is configured to rotate relative to the first frame member when the reel is rotated;
wherein the second ring member is configured to rotate relative to the second frame member when the reel is rotated;
wherein the first ring member includes protrusions configured to extend through openings in the first flange of the reel, and a radially outer surface of each of the protrusions is configured to bear against an inner surface of a drum of the reel that extends between the first flange and the second flange of the reel;
wherein the second ring member includes protrusions configured to extend through openings in the second flange of the reel, and a radially outer surface of each of the protrusions is configured to bear against the inner surface of the drum of the reel; and
wherein the first ring member includes a radial outer portion configured to engage an outer surface of the first flange of the reel radially outward of the drum to prevent deformation of the first flange;
wherein the second ring member includes a radial outer portion configured to engage an outer surface of the second flange of the reel radially outward of the drum to prevent deformation of the second flange;
wherein the first ring member is configured to include radially extending support structures configured to engage the outer surface of the first flange of the reel radially outward of the drum to prevent deformation of the first flange;
wherein the second ring member is configured to include radially extending support structures configured to engage the outer surface of the second flange of the reel radially outward of the drum to prevent deformation of the second flange; and wherein the first ring member is configured to be removed from the first flange of a reel of cable, and the second ring member is configured to be removed from a second flange of a reel of cable such that the reel can be removed from the reusable reel holder to permit a new reel to be mounted on the reusable reel holder.

2. A bag and reusable reel holder assembly comprising: the reel holder of claim 1;
a container configured to receive the reel holder and a reel of cable.

3. The bag and reusable reel holder assembly of claim 2, further comprising a reel of fiber optic cable configured to be held by the reel holder; and
wherein the container is a bag.

4. The bag and reusable reel holder assembly of claim 3, wherein the reel of cable, the first ring member, and the second ring member are configured to rotate relative to the bag.

5. The bag and reusable reel holder assembly of claim 2, wherein the reel of cable, the first ring member, and the second ring member are configured to rotate relative to the container.

6. A reusable reel holder comprising:
a first reel holder member including a first frame member configured to be rotatingly coupled with a first ring member; and
a second reel holder member including a second frame member configured to be rotatingly coupled with a second ring member;
wherein the first ring member is configured to be coupled with a first flange of a reel of cable;
wherein the second ring member is configured to be coupled with a second flange of the reel of cable;
wherein the first ring member includes protrusions configured to extend through the first flange of the reel, and a radially outer surface of each of the protrusions is configured to bear against an inner surface of a drum of the reel that extends between the first flange and the second flange of the reel;
wherein the second ring member includes protrusions configured to extend through the second flange of the reel, and a radially outer surface of each of the protrusions is configured to bear against the inner surface of the drum of the reel; and
wherein the first ring member is configured to engage an outer surface of the first flange of the reel radially outward of the drum to prevent deformation of the first flange;
wherein the second ring member is configured to engage an outer surface of the second flange of the reel radially outward of the drum to prevent deformation of the second flange; and
wherein the first ring member is configured to be removed from the first flange of a reel of cable, and the second ring member is configured to be removed from a second flange of a reel of cable such that the reel can be removed from the reusable reel holder to permit a new reel to be mounted on the reusable reel holder.

7. The reusable reel holder of claim 6,
wherein the first ring member includes a radial outer portion configured to engage an outer surface of the first flange of the reel radially outward of the drum to prevent deformation of the first flange.

8. The reusable reel holder of claim 6,
wherein the second ring member includes a radial outer portion configured to engage an outer surface of the second flange of the reel radially outward of the drum to prevent deformation of the second flange, and
wherein the first ring member is configured to include radially extending support structures configured to engage an outer surface of the first flange of the reel radially outward of the drum to prevent deformation of the first flange.

9. The reusable reel holder of claim 6,
wherein the second ring member is configured to include radially extending support structures configured to engage an outer surface of the second flange of the reel radially outward of the drum to prevent deformation of the second flange.

10. A bag and reusable reel holder assembly comprising: the reel holder of claim 6;
a container configured to receive the reel holder and a reel of cable.

11. The bag and reusable reel holder assembly of claim 10, further comprising a reel of fiber optic cable configured to be held by the reel holder; and
wherein the container is a bag.

12. The bag and reusable reel holder assembly of claim 11, wherein the reel of cable, the first ring member, and the second ring member are configured to rotate relative to the bag.

13. The bag and reusable reel holder assembly of claim 10, wherein the reel of cable, the first ring member, and the second ring member are configured to rotate relative to the container.

14. A reusable reel holder comprising:
a first reel holder member including a first frame member configured to be rotatingly coupled with a first ring member; and
a second reel holder member including a second frame member configured to be rotatingly coupled with a second ring member;
wherein the first ring member is configured to be coupled with a first flange of a reel of cable;
wherein the second ring member is configured to be coupled with a second flange of the reel of cable;
wherein the first ring member includes protrusions configured to extend through the first flange of the reel and to bear against an inner surface of a drum of the reel that extends between the first flange and the second flange of the reel;
wherein the second ring member includes protrusions configured to extend through the second flange of the reel and to bear against the inner surface of the drum of the reel; and
wherein the first ring member is configured to engage an outer surface of the first flange of the reel radially outward of the drum to prevent deformation of the first flange; and
wherein the second ring member is configured to engage an outer surface of the second flange of the reel radially outward of the drum to prevent deformation of the second flange.

15. The reusable reel holder of claim 14,
wherein the first ring member includes a radial outer portion configured to engage an outer surface of the first flange of the reel radially outward of the drum to prevent deformation of the first flange.

16. The reusable reel holder of claim 14,
wherein the second ring member includes a radial outer portion configured to engage an outer surface of the second flange of the reel radially outward of the drum to prevent deformation of the second flange, and
wherein the first ring member is configured to include radially extending support structures configured to engage an outer surface of the first flange of the reel radially outward of the drum to prevent deformation of the first flange.

17. The reusable reel holder of claim 14,
wherein the second ring member is configured to include radially extending support structures configured to engage an outer surface of the second flange of the reel radially outward of the drum to prevent deformation of the second flange.

18. A bag and reusable reel holder assembly comprising: the reel holder of claim 14;
a container configured to receive the reel holder and a reel of cable.

19. The bag and reusable reel holder assembly of claim 18, further comprising:
a reel of fiber optic cable configured to be held by the reel holder; and
wherein the container is a bag.

20. The bag and reusable reel holder assembly of claim 19, wherein the reel of cable, the first ring member, and the second ring member are configured to rotate relative to the bag.

21. The bag and reusable reel holder assembly of claim 18, wherein the reel of cable, the first ring member, and the second ring member are configured to rotate relative to the container.

22. A reusable reel holder comprising:
a first reel holder portion including a first frame portion structurally configured to be rotatingly coupled with a first ring portion; and
a second reel holder portion including a second frame portion structurally configured to be rotatingly coupled with a second ring portion;
wherein the first ring portion is structurally configured to be coupled with a first flange portion of a reel of cable;
wherein the second ring portion is structurally configured to be coupled with a second flange portion of the reel of cable;
wherein the first ring portion includes a support portion structurally configured to extend through the first flange of the reel and bear against an inner surface portion of a drum portion of the reel that extends between the first flange portion and the second flange portion of the reel so as to radially support the drum portion; and
wherein the second ring portion includes a support portion structurally configured to extend through the second flange portion of the reel and bear against an inner surface portion of the drum portion of the reel so as to radially support the drum portion.

23. The reusable reel holder of claim 22,
wherein the first ring portion includes a radial outer portion structurally configured to engage an outer surface portion of the first flange portion of the reel radially outward of the drum portion to prevent deformation of the first flange portion; and
wherein the second ring portion includes a radial outer portion structurally configured to engage an outer surface portion of the second flange portion of the reel radially outward of the drum portion to prevent deformation of the second flange portion.

24. The reusable reel holder of claim 22,
wherein the first ring portion is structurally configured to include a radially extending support portion structurally configured to engage an outer surface portion of the first flange portion of the reel radially outward of the drum portion to prevent deformation of the first flange portion; and
wherein the second ring portion is structurally configured to include a radially extending support portion structurally configured to engage an outer surface portion of the second flange portion of the reel radially outward of the drum portion to prevent deformation of the second flange portion.

25. A bag and reusable reel holder assembly comprising: the reel holder of claim 22;
a container configured to receive the reel holder and a reel of cable.

26. The bag and reusable reel holder assembly of claim 25, further comprising:
a reel of fiber optic cable configured to be held by the reel holder; and
wherein the container is a bag.

27. The bag and reusable reel holder assembly of claim 26, wherein the reel of cable, the first ring portion, and the second ring portion are structurally configured to rotate relative to the bag.

28. The bag and reusable reel holder assembly of claim 25, wherein the reel of cable, the first ring portion, and the second ring portion are structurally configured to rotate relative to the container.

* * * * *